UNITED STATES PATENT OFFICE.

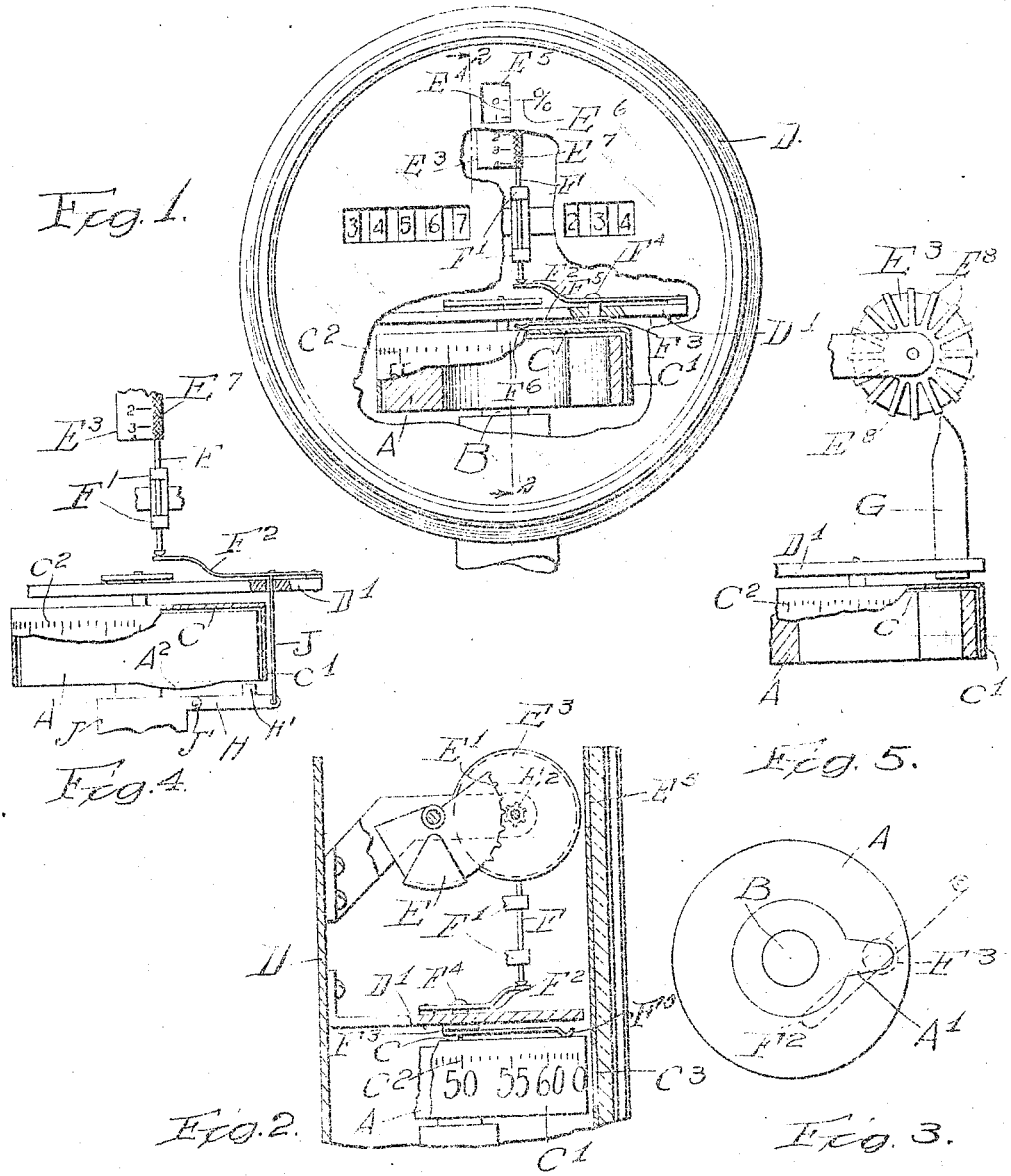

JOHN K. STEWART, OF CHICAGO, ILLINOIS, ASSIGNOR TO STEWART-WARNER SPEEDOMETER CORPORATION, OF CHICAGO, ILLINOIS, A CORPORATION OF VIRGINIA.

DAMPING DEVICE FOR GRADE-INDICATORS.

1,200,899.     Specification of Letters Patent.     Patented Oct. 10, 1916.

Application filed January 27, 1913. Serial No. 744,343.

*To all whom it may concern:*

Be it known that I, JOHN K. STEWART, a citizen of the United States, residing at Chicago, in the county of Cook and State of Illinois, have invented new and useful Improvements in Damping Devices for Grade-Indicators, of which the following is a specification, reference being had to the accompanying drawings, forming a part thereof.

The purpose of this invention is to provide means for damping the swing of the pendulum and its connected indicating means in a grade meter to render the instrument "dead-beat," and is particularly adapted for embodiment in such instrument when combined with a speedometer or an odometer for use on vehicles.

It consists of the features and elements shown and described in the drawings as indicated in the claims.

In the drawings:—Figure 1 is a front elevation of a combined speedometer, odometer and grade indicator with parts broken away to reveal the internal construction. Fig. 2 is a vertical section of the essential parts taken as indicated at line 2—2 Fig. 1, omitting, however, the odometer train indicated therein. Fig. 3 is a plan view of the magnet of the speedometer with the position of the armature button of the damping device indicated in dotted lines. Fig. 4 is a detail elevation partly in section showing the modified construction for a grade meter damping device. Fig. 5 is a detail view taken similarly to Fig. 4 and showing another modified form of a grade meter damping device.

As shown in the drawings, this device is embodied in a combination instrument for motor vehicles, which includes a magnetic speedometer of familiar type which comprises a magnet, A, rotatably mounted upon a shaft, B, for influencing a drag disk, C, whose downwardly hanging flange, $C^1$, carries the speed indicating scale, $C^2$, which appears before the window, $C^3$, in the casing, D. The grade indicator which is mounted in the same casing, D, comprises a pendulum, E, carrying rigidly a segmental gear, $E^1$, which meshes with a pinion, $E^2$, fixed to an indicating wheel, $E^3$, carrying a grade indicating scale, $E^4$, positioned to appear at a window, $E^5$, in the casing, D. It is obvious that the position of the wheel, $E^3$, with respect to any fixed point, as, $E^6$, on the casing will indicate the inclination of the vehicle on which the instrument is mounted if the scale, $E^4$, is correctly proportioned for the purpose. It is found, however, that sudden acceleration of the vehicle in starting or stopping quickly will overcome the inertia of the pendulum, E, and will thus move the scale of the grade indicator even on level ground, and that if a damping device is employed which merely tends to oppose movement of the grade indicating parts, these parts having been disturbed from their proper position by the sudden acceleration of the vehicle will not readily return to such proper position because hindered by the damping device, and the reading will thus be untrue. This difficulty is overcome by the present invention which employs a brake member, F, shown as a pin carried loosely in a bracket, $F^1$, and having its upper end normally in contact with the rim of the indicating wheel, $E^3$, while its lower end rests upon a spring arm, $F^2$, fixed to a frame member, $D^1$, of the instrument. The frame member, $D^1$, extends directly above the magnet, A, of the speedometer which is constantly in rotary motion when the vehicle is traveling. The form of the magnet is indicated in Fig. 3 which shows a notch, $A^1$, whose function is similar to the more usual air gap of a horse-shoe or "split ring" magnet, such as is commonly employed in instruments of this class; that is, the poles of the magnet will be found to be located at either side of the gap or notch, $A^1$, and a portion of the magnetic flux passes outside the metallic circuit into the air at this point and is thus available for influencing the drag disk, C. The magnetic field thus created at this part of the magnet is further utilized for purposes of this invention by mounting loosely in the frame member, $D^1$, above the path of rotation of the notch, $A^1$, or in the vicinity of said path, an armature button, $F^3$, whose head, $F^4$, engages the top side of the spring arm, $F^2$, so that every time the notch, $A^1$, of the magnet passes under the armature button, $F^3$, in its rotation, the said button is drawn downwardly by the magnetic force, thus retracting the spring arm, $F^2$, and relieving the brake pin, F, of its pressure so as to permit rotation of the indicating wheel, $E^3$, if the influence of gravity on the pendulum, E, at the instant should tend to effect such rotation. Since the rotation of the magnet, A, is normally at a moderately rapid rate, the brake pin, F, is given a rapid tapping action with respect to the indicating wheel, $E^3$, and thus permits only an intermittent movement of the latter and renders it practically "deadbeat" at all times. If desired, the engagement of the brake pin, F, with the rim of the wheel may be made more positive by nurling this portion of the wheel as indicated at, $E^7$.

When the grade meter is combined in the same casing with a speedometer, as indicated in Fig. 1, and if difficulty is experienced in rendering the speed-indicating disk C, steady at the correct position corresponding to the speed to be indicated, the armature button, $F^3$, may be provided on its under side with an extending spring arm, $F^5$, preferably of non-magnetic material, which will be moved downwardly with the armature when the latter is attracted by the passage of the magnet poles, so that its tip, $F^6$, will be drawn temporarily into contact with the top surface of the drag disk, C, and will thus tend frictionally to absorb any excess movement of said disk and will assist in bringing it to rest at the proper indicated position.

The modification of the damping device for the grade meter is illustrated in Fig. 5 as comprising merely a fixedly mounted soft iron post, G, having its lower end within the range of influence of the poles of the magnet, A, in their rotation, and its upper end extending toward the rim of the grade-indicating wheel, $E^3$. The rim of said wheel is formed with a series of projecting teeth, $E^8$, preferably corresponding each to a scale division of the graduated face of the wheel; and the upper end of the post, G, is reduced or tapered to a cross-section substantially equal to that of one of said teeth, $E^8$. Thus, as the poles of the magnet, A, pass under the lower end of the soft iron post, G, said post will be temporarily magnetized, and the concentrated magnetic flux at its upper tapered end will tend for the instant to hold the indicating wheel, $E^3$, stationary by strongly attracting the nearest of its teeth, $E^8$. This action being intermittent will not hinder the wheel, $E^3$, from assuming the correct grade-indicating position to which the pendulum, E, tends to move it, but will effectively check other movement due to the sudden acceleration of the vehicle. If, on the other hand, it is preferred not to depend at all upon the magnetic principle for operating the damping device, the modification illustrated in Fig. 4 may be employed, in which a cam shoulder, $A^2$, on the under side of the magnet, A, is arranged to actuate a lever, H, connected through a link, J, with the spring arm, $F^2$, for withdrawing the latter and temporarily releasing the brake pin, F, during the rotation of the magnet, A.

As illustrated in Fig. 4 the lever, H, may be fulcrumed in a lug, $J^1$, extending from the frame, J, in which the magnet is journaled, and the said lever may be provided with an upstanding boss or projection, $H^1$, positioned for engagement with the cam shoulder, $A^2$, during rotation of the magnet, A.

I claim:—

1. In a grade meter comprising a pendulum, braking means for said pendulum including a brake device, a rotating member, and means carried thereby adapted for rendering said brake device alternately operative and inoperative with respect to said pendulum.

2. In a grade meter comprising a pendulum, braking means for said pendulum including a brake device, a rotating member, means for yieldingly holding said brake device in operative position with respect to the pendulum, and means operatively connected to said rotating member and adapted for intermittently retracting said brake device.

3. In a grade meter comprising a pendulum, in combination with a continuously rotated shaft, braking means for said pendulum including a brake device, and means operatively connected with the shaft adapted for rendering said brake device alternately operative and inoperative with respect to said pendulum.

4. In combination with a magnet mounted for rotation of its poles about an axis, a grade meter comprising a pendulum, and braking means for said pendulum including a brake device comprising an armature positioned proximate to the path of rotation of said magnet poles whereby the rotation of said magnet serves to render said brake device alternately operative and inoperative with respect to the pendulum.

5. In combination with a magnet mounted for rotation of its poles about an axis, a grade meter comprising a pendulum, and braking means for said pendulum including a brake device comprising a brake and a spring mounted for yieldingly retaining the brake in operative position with respect to the pendulum, and an armature positioned proximate to the path of rotation of the said magnet poles and connected with the said spring whereby the rotation of the magnet serves to attract said armature for releasing the brake from the spring pressure.

6. In a grade meter comprising a pendulum, and a wheel geared up therefrom, braking means for said pendulum including a brake device comprising a brake member mounted for contact with said wheel, a spring positioned to maintain such contact, a rotating member, and means operatively connected thereto adapted for intermittently withdrawing said spring to release the wheel from the brake.

7. In a grade meter comprising a pendulum, and a wheel geared up therefrom, braking means for said pendulum including a brake device comprising a pin mounted for contact with said wheel, the contacting portion of said wheel being knurled or roughened, a spring positioned to maintain such contact, a rotating member, and means operatively connected thereto adapted for intermittently withdrawing said spring to release the wheel from the brake.

8. In combination in a magnetic speedometer, comprising a rotating member having a magnet mounted for rotation of its poles about an axis and a drag disk mounted proximate to the path of rotation of said poles, a grade indicator comprising a pendulum-operated member, a brake device, means for yieldingly holding said brake device in operative position with respect to the pendulum-operated member, means operatively associated with the said rotating member and adapted for independently retracting said holding means, and a brake device for the drag disk operatively connected with said retracting means and positioned for contact with said drag disk during the retraction of the pendulum brake.

In testimony whereof I have hereunto set my hand at Chicago, Illinois, this 31 day of October, 1912.

JOHN K. STEWART.

Witnesses:
C. P. SMITH,
STANHOPE HUDSON.